United States Patent
Karvounis et al.

(10) Patent No.: US 11,960,011 B2
(45) Date of Patent: Apr. 16, 2024

(54) SYSTEM AND METHOD FOR VALIDATING GNSS LOCATION INPUT

(71) Applicant: Trx Systems, Inc., Greenbelt, MD (US)

(72) Inventors: John George Karvounis, College Park, MD (US); Benjamin Edward Funk, Hanover, MD (US); Jonathan Morton Fetter-Degges, Washington, DC (US); Carole Ann Teolis, Glenn Dale, MD (US)

(73) Assignee: TRX SYSTEMS, INC., Greenbelt, MD (US)

( * ) Notice: Subject to any disclaimer, the term of this patent is extended or adjusted under 35 U.S.C. 154(b) by 574 days.

(21) Appl. No.: 17/166,810

(22) Filed: Feb. 3, 2021

(65) Prior Publication Data

US 2021/0239848 A1    Aug. 5, 2021

Related U.S. Application Data

(60) Provisional application No. 62/969,503, filed on Feb. 3, 2020.

(51) Int. Cl.
*G01S 19/00* (2010.01)
*G01S 19/11* (2010.01)
(Continued)

(52) U.S. Cl.
CPC .......... *G01S 19/396* (2019.08); *G01S 19/11* (2013.01); *G01S 19/243* (2013.01); *G01S 19/40* (2013.01); *G06F 18/25* (2023.01)

(58) Field of Classification Search
None
See application file for complete search history.

(56) References Cited

U.S. PATENT DOCUMENTS 9,031,782 B1 * 5/2015 Lemay .............. G06T 7/277
701/445
9,513,374 B2 * 12/2016 Deshpande .......... G01S 19/49
(Continued)

OTHER PUBLICATIONS

Connie Lee; "Spoofing Risks Prompt Military to Update GPS Devices"; https://www.nationaldefensemagazine.org/articles/2018/1/4/spoofing-risks-prompt-military-to-update-gps-devices#:~:text=In%202011%2C%20%20Iranian%20citizens%20turned,GPS%20coordinates%20of%20the%20system; National Defense; Jan. 2018; accessed Feb. 10, 2021; 7 pages.

*Primary Examiner* — Truc M Do
(74) *Attorney, Agent, or Firm* — BakerHostetler

(57) ABSTRACT

A computer implemented method of validating an output from a GNSS at a receiver including a fusion system comprising location sensors. A location estimate and a location error estimate are computed. A navigation update including a sensor location estimate and sensor location error estimate is also computed with the fusion system based on sensor measurements from the location sensors. A determination is made as to whether or not GNSS filters should be applied based at least on the location estimate, the sensor location estimate, and the sensor location error estimate. When GNSS filters should be applied, the location estimate and/or the location error estimate may be adjusted or rejected and a new navigation update may be computed with the fusion system based on the adjustment or rejection. When the GNSS filters should not be applied, the new navigation update is computed with the location estimate and the location error estimate.

20 Claims, 15 Drawing Sheets

(51) Int. Cl.
    *G01S 19/24*     (2010.01)
    *G01S 19/39*     (2010.01)
    *G01S 19/40*     (2010.01)
    *G06F 18/25*     (2023.01)

(56) References Cited

U.S. PATENT DOCUMENTS

| | | | |
|---|---|---|---|
| 2006/0276198 A1* | 12/2006 | Michelon | G01S 19/46 |
| | | | 701/1 |
| 2012/0221244 A1* | 8/2012 | Georgy | G01S 19/47 |
| | | | 701/472 |
| 2014/0152493 A1* | 6/2014 | Scherzinger | G01S 19/393 |
| | | | 342/357.3 |
| 2015/0341886 A1* | 11/2015 | Miller | G01S 5/0273 |
| | | | 370/317 |
| 2018/0074210 A1* | 3/2018 | Glocker | G01S 19/42 |
| 2019/0094379 A1* | 3/2019 | Chhokra | G01S 19/42 |

\* cited by examiner

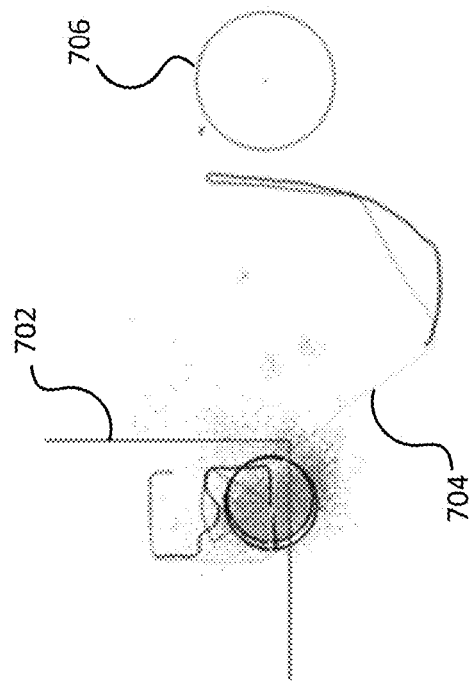
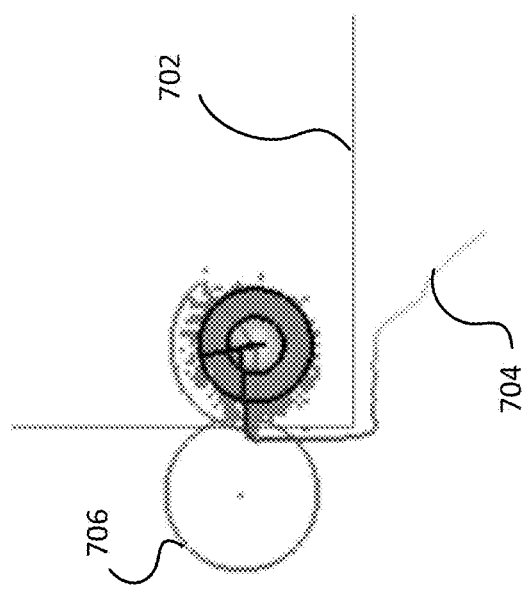
FIG. 7a
FIG. 7b

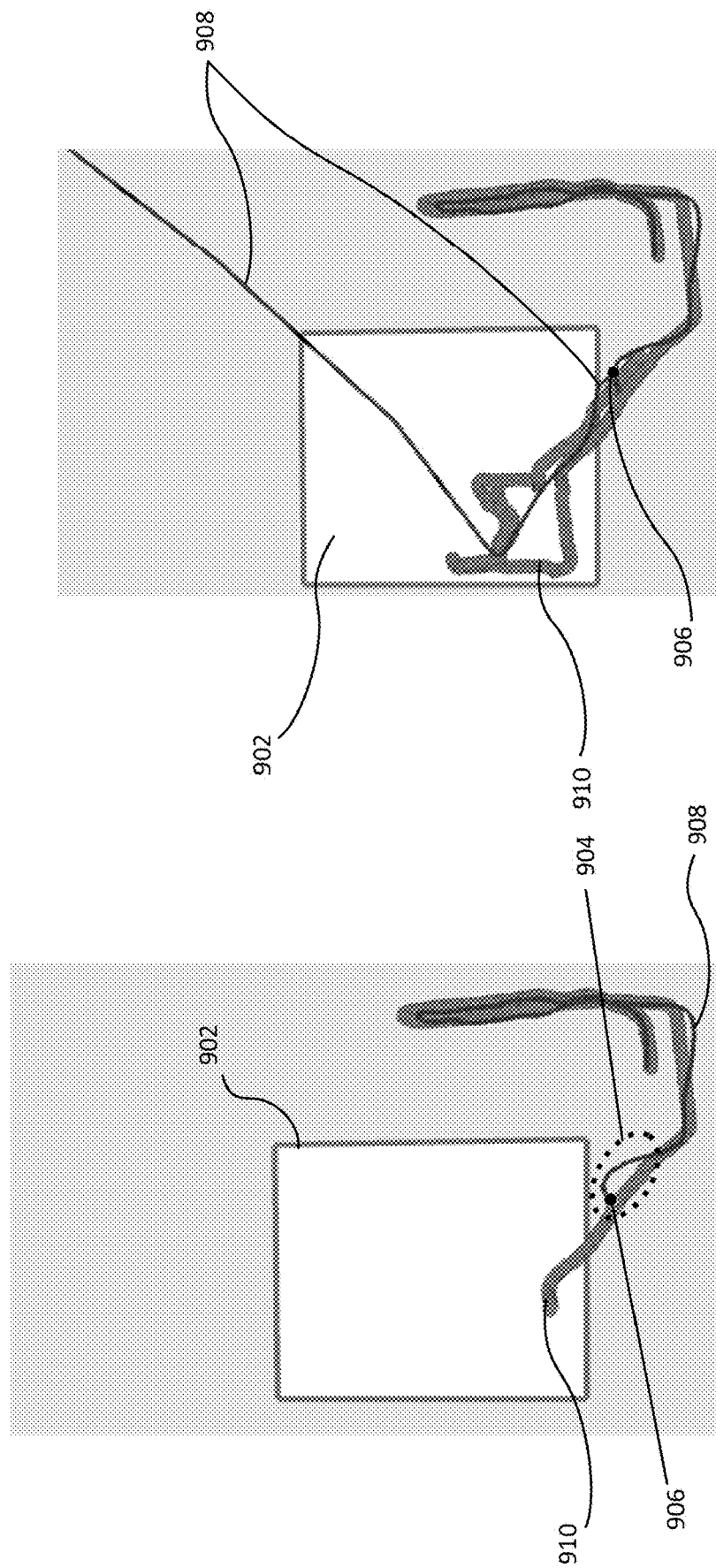

SYSTEM AND METHOD FOR VALIDATING GNSS LOCATION INPUT

CROSS REFERENCE TO RELATED APPLICATIONS

This application claims priority to U.S. Provisional Patent Application No. 62/969,503, filed Feb. 3, 2020, entitled "System and Method for Validating GNSS Location Input", which is incorporated by reference herein.

FIELD OF THE INVENTION

The disclosure relates to systems, computer program products, and methods for validating the output of Global Navigation Satellite Systems (GNSS).

BACKGROUND

Many systems today rely on Global Navigation Satellite Systems (GNSS) such as Global Positioning System (GPS) to provide accurate location estimation. However, GNSS location estimation (including GPS and other similar systems such as Galileo, GLONASS) relies on receiving very low-powered signals that are susceptible to interference by buildings, dense tree cover and other artificial or natural obstacles. As a result, these signals may be blocked altogether, or the accuracy of the signals may be reduced due to multipath reflections or poor satellite geometry.

Additionally, emerging threats exist from jamming, where the signal is entirely intentionally denied, and spoofing, where signals may be generated that lead the GNSS devices and end users to believe they are in a different position than they are actually located. Such incidents have increased in number across the globe, with the low cost of disruption technologies making these incidents a significant threat.

SUMMARY

The disclosure provides systems, computer program products, and methods for detecting and compensating for GNSS interference. The accuracy of GNSS location may be improved when GNSS interference is detected and compensation is made.

One embodiment presents a computer implemented method of validating an output from a GNSS by receiving at a GNSS receiver including a fusion system an output from at least one satellite in the GNSS, the fusion system comprising location sensors. A location estimate and a location error estimate are then computed. A navigation update including a sensor location estimate and sensor location error estimate is also computed with the fusion system based on sensor measurements from the location sensors. A determination may then be made that GNSS filters should be applied based at least on the location estimate, the sensor location estimate, and the sensor location error estimate. When GNSS filters should be applied, the location estimate and/or the location error estimate may be adjusted or rejected and a new navigation update may be computed with the fusion system based on the adjustment or rejection. When the GNSS filters should not be applied, the new navigation update is computed with the location estimate and the location error estimate.

BRIEF DESCRIPTION OF THE DRAWINGS

FIG. 7a depicts an exemplary illustration of a GNSS system repeating a last known GNSS location when the GNSS system loses its signal.

FIG. 7b depicts another exemplary illustration of a GNSS system repeating a last known GNSS location when the GNSS system loses its signal.

FIG. 8b depicts an exemplary illustration of the fusion solution of FIG. 8a.

FIG. 8c depicts an exemplary illustration of the GNSS signal interference of FIG. 8a.

FIGS. 9a and 9b depict an exemplary illustration of intentional GNSS interference where a GNSS simulation is broadcast inside a building.

DETAILED DESCRIPTION

Figure 1:
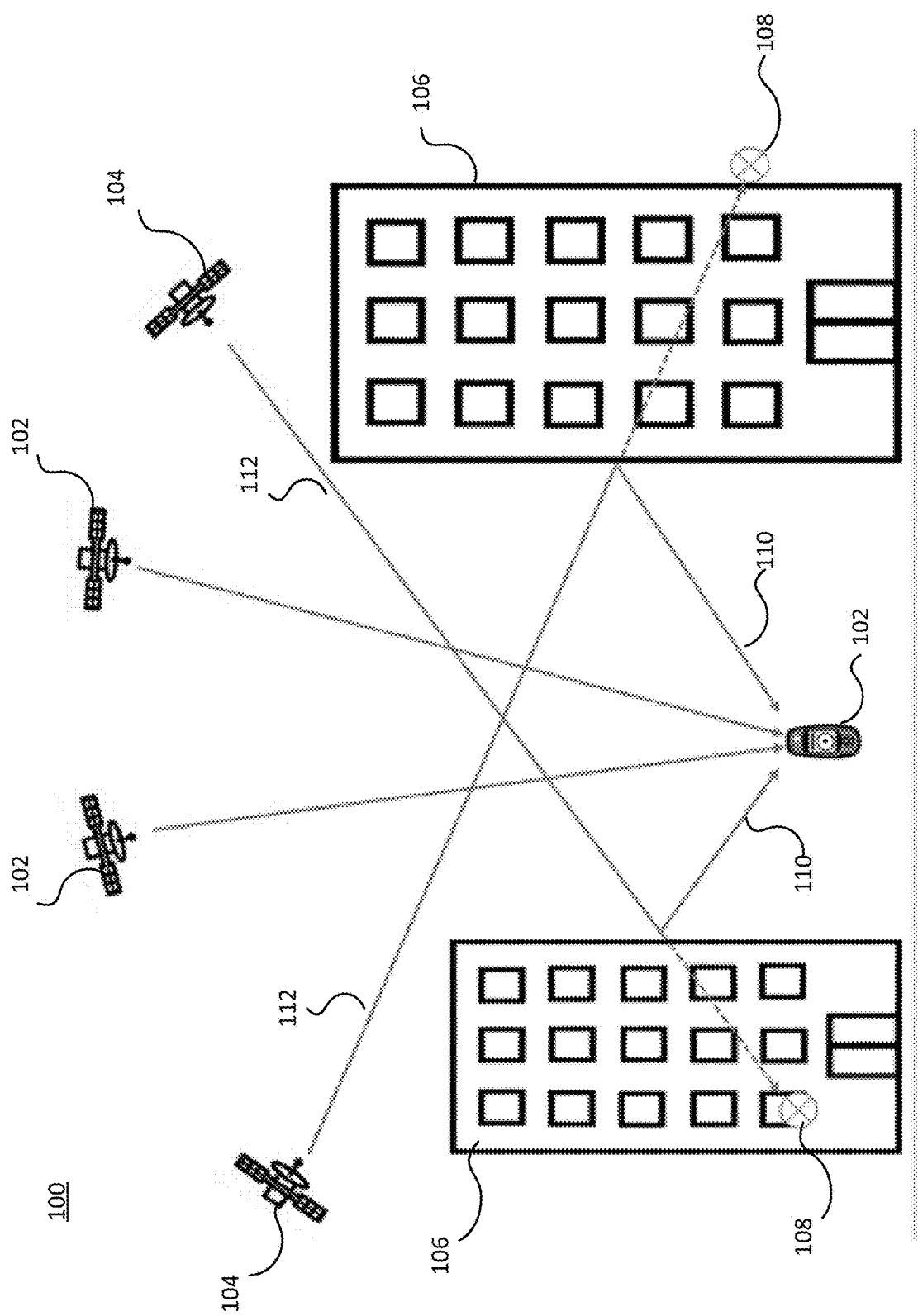
FIG. 1 depicts an exemplary illustration of environmental GNSS interference due to multipath reflections.

The disclosure herein is directed to systems, computer program products, and methods for detecting and compensating for GNSS interference. GNSS interference may result from environmental interference or from electronic signal interference. GNSS location input may be adapted or rejected when interference is detected.

GNSS integrity monitoring software may use information from other location sensors and map data to validate GNSS location input to a navigation fusion solution so that it may be adapted or rejected based on these other inputs. A typical multi-sensor fusion solution might include GNSS in addition to some combination of accelerometers, gyroscopes, barometer, magnetic, ranging, vision and more. Map data can include terrain, tree coverage, building models, roads and trails, and more.

Because every sensor has its weakness, it is necessary to be able to intelligently fuse inputs from a variety of sensors and to gracefully degrade the input of those sensors that become unavailable or unreliable. For example, a navigation fusion engine might use GPS, when available, to enhance inertial dead reckoning or computer vision to enable the tracking of a mobile device. When GPS is unavailable or unreliable, magnetic sensors, pressure sensors, Bluetooth low energy (BLE) sensors and ultra-wideband (UWB) ranging sensors are options that may be used to continue to provide location inputs to a navigation fusion solution. Map information such as terrain, Wi-Fi fingerprints, and available 3D building models (building outline, number of floors, estimated floor heights and locations of structural features, e.g. stairs, elevators, walls, etc.) may also be used to improve location.

Bayesian filters such as Kalman filters and particle filters are often utilized in navigation fusion engines to enable the fusion system to fuse the disparate sensor information. Each sensor or map input provides different information that must be interpreted to be fused into the navigation solution. Dead reckoning or idiothetic sensors, such as accelerometers, gyros, visual motion inputs and wheel encoders, provide measurements of self-motion. Allothetic sensors provide external measurements of the environment referenced to the earth or a map. For example, processed GPS measurements provide earth reference latitude and longitude positions, processed barometric pressure provides elevation, and processed magnetic sensor readings provide a heading referenced to earth's magnetic field. Matching a Wi-Fi fingerprint or other sensed beacon to a known map can also provide latitude, longitude and elevation input. Each of these sensor measurements has uncertainty and to accurately fuse disparate sensor and map inputs, it is critical to have a good estimate of the integrity and error distributions of the sensor input and to have a fusion engine that can handle a variety of error distributions.

Allothetic sensors provide input that is already referenced to the earth whereas idiothetic sensors need to be initialized by at least one input that provides that earth referenced location fix, such as a GPS point or a user map correction (i.e., locating the sensor at a specific point on the earth). Any sensor or input providing the location fix may be sufficient. A series of at least two location fixes separated by a threshold distance may be needed to set heading and scale, and a third fix may be needed to solve for other system parameters, such as gyro drift.

Adaptations to Account for Environmental Interference: Understanding the GNSS environment may aid in a proper interpretation of GNSS signals when fusing them into the location estimation. As seen in FIG. 1, multipath may include reflections 110 from non-line of sight satellites 104. For example, in urban environments 100, multipath may result in interference of the direct path of GNSS signals. This interference may be caused by buildings 106. The reflections 110 may add to GNSS computed location error by creating an excess path length for the non-line of sight signals 112. Because GNSS location computation relies on very accurate computation of the range from a receiver 102 to each satellite 102, 104, reflections 110 affect the ability of the receiver 102 to compute an accurate location and a location error estimate. For example, the excess path length for the non-line of sight signals 112 may project an image of the receiver 102 in an incorrect location 108. The GNSS receiver 102 may compute the location error estimate based on factors such as the number of satellites 102, 104 that are providing input, the geometry of the satellites 102, 104, and the signal strengths received.

Figure 2:
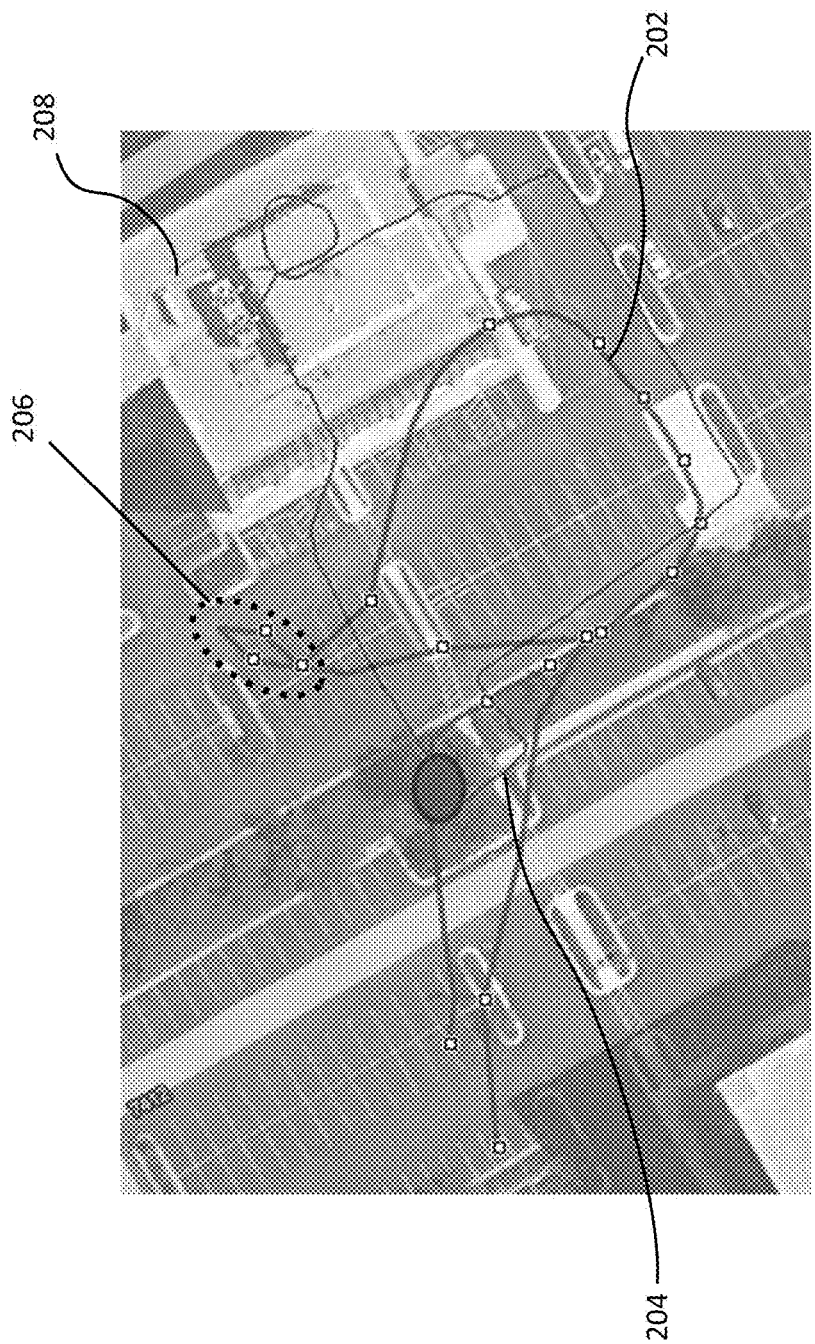
FIG. 2 depicts an exemplary illustration of a distorted GNSS reported location near a building.

If the receiver 102 does not have the environmental information needed to account for interference from buildings 106, the receiver 102 may inaccurately estimate location and location uncertainty. For example, when the receiver 102 is near buildings 106 it may underestimate the location uncertainty. Fusing the GNSS position measurement into the navigation solution with the incorrect estimate of uncertainty may add error to the fusion solution. Location accuracy may also be affected by geometry of the satellites 102, 104, as buildings 106 and other natural obstructions may block satellites 102, 104 from one of more sides of the receiver 102. As seen in FIG. 2, GNSS reported locations are distorted near buildings. A GNSS track 202 becomes a distorted path 206 near a building 208. An accurate computed position may be calculated by a fusion solution track 204 by appropriately adjusting the GNSS error or rejecting the GNSS altogether.

Referring to FIG. 1, environmental information may be provided to the receiver 102 in order to more accurately estimate location and location uncertainty. For example, map data may be provided to the receiver 102. Map data providing building models and terrain, etc., is becoming available, for example from ESRI and Open Street Maps. Knowledge of the GNSS receiver's 102 proximity to buildings 106 and the surrounding terrain can be used to adjust GNSS input to a fusion solution, which may adjust the GNSS error estimate, remove satellites from the location computation, or reject the GNSS measurement.

Figure 3:
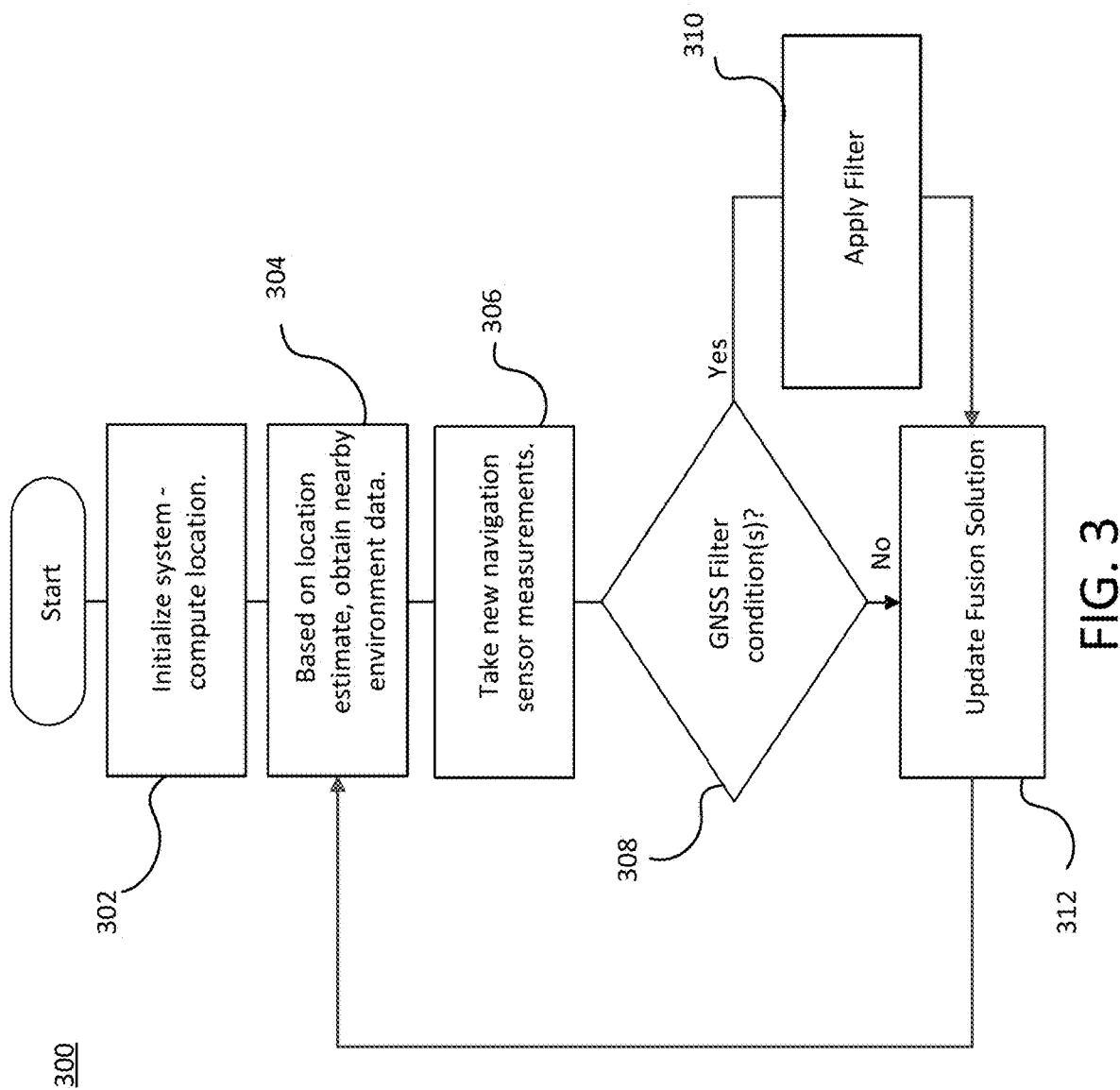
FIG. 3 is a flow chart illustrating one example of a method for adjusting GNSS input to a fusion solution.

Various methods may be used to adjust GNSS input to a fusion solution. One such method may be seen in FIG. 3. The method 300 begins with initializing the system (operation 302) by ensuring that the fusion system is in a good state with a reasonable location estimate and location error estimate. These reasonable estimates may be based on a good GNSS (or good GNSS fix) or a user map check-in. The method 300 continues with loading nearby environmental data based on the location estimation (operation 304). Environmental data may include building models, which may include building outlines or building height information obtained from Open Street Maps. Environmental data may also include terrain data. Next, the method 300 continues with taking new navigation sensor measurements (operation 306). These new navigation sensor measurements may include a GNSS receiver location and location error estimate or raw measurements from the receiver (e.g., pseudo range, carrier phase, doppler) and other sensor measurements (e.g., inertial, vision, radio frequency). The method 300 then determines if one or more GNSS filters based on environment, location estimation, or motion should be applied (operation 308). If GNSS filters should be applied, then the method 300 applies the one or more filters (operation 310), updates the fusion solution (operation 312), and returns to operation 304. If no GNSS filters should be applied, then the method 300 updates the fusion solution (operation 312) and returns to operation 304.

Environmental information may also be used to adjust the GNSS error estimate. For example, referring to FIG. 1, the GNSS error estimate or correction strength may be adjusted based on the receiver's 102 proximity to buildings 106 and the height of the buildings 106. When the GNSS receiver 102 is near buildings 106, the error estimate or correction strength may be increased in radius or may be increased along a single axis (in direction of the buildings), providing more of an ellipse.

Figure 4:
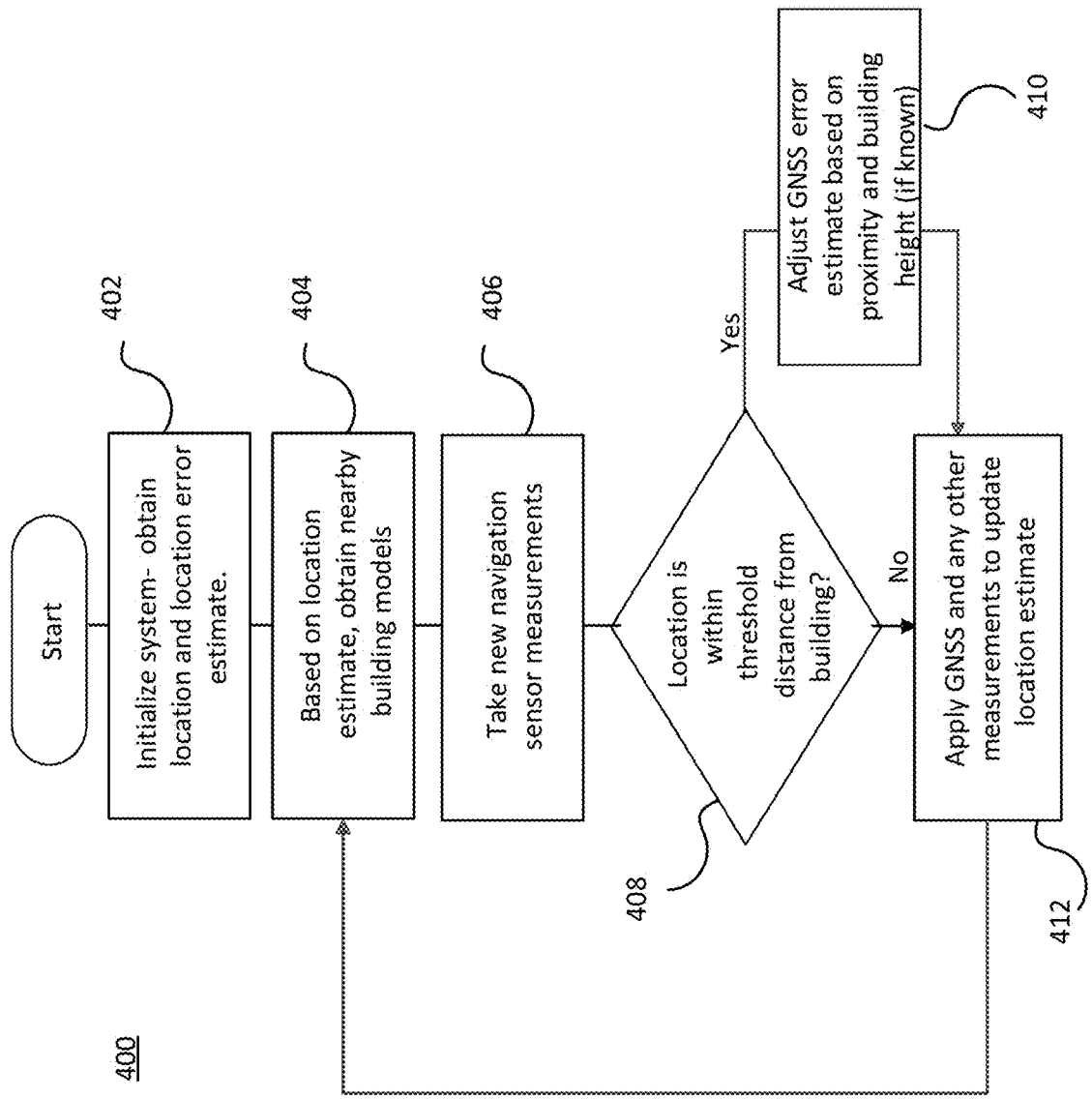
FIG. 4 is a flow chart illustrating one example of a method for determining when to adjust a GNSS error estimate.

FIG. 4 shows one method for adjusting the GNSS error estimate based on environmental information. The method 400 begins with initializing the system and obtaining a location estimation and a location error estimation (operation 402). A reasonable location estimate is needed in order to know which buildings are nearby. The location estimate may be based on good GNSS or user map check-in. The method 400 continues with obtaining building models for nearby buildings based on the location estimation (operation 404). The building models may include building outlines or building height information. Building height information may be obtained from Open Street Maps or other sources. The method 400 continues with taking new navigation sensor measurements (operation 406). The location estimate and location error estimate may be obtained as output from any location service providing a sensor fusion solution, or directly from the GNSS receiver.

Next, the method 400 determines whether the location is within a threshold distance from the building (operation 408). If the location is within the threshold distance from the building, the method 400 continues to adjust the GNSS error estimate based on proximity and building height, if know (operation 410), then applies GNSS and any other measurements to update the location estimate (operation 412). For example, if the location is within 5 feet of any building, the GNSS error estimate may be tripled before being added into the fusion solution. If the location is within 20 feet of any building, the GNSS error estimate may be doubled for buildings above a certain height. By expanding the GNSS error bounds, the location fusion solution remains accurate based on other sensor inputs to the fusion solution (e.g. inertial, vision, etc.) The method 400 then returns to operation 404. If the location is not within the threshold distance from the building, the method 400 completes operation 412 and then returns to operation 404.

In another embodiment, environmental information may be used to eliminate some satellites from the location computation. For example, satellites that do not provide direct line of sight signals to the receiver may be eliminated. Referring to FIG. 1, the location computation may include only satellites 102 that are more likely to provide direct line of sight signals to the receiver 102. The location computation may not include non-line of sight satellites 104. In other environments, the satellites eliminated from the location computation may vary depending on the receiver's location relative to the buildings.

Figure 5:
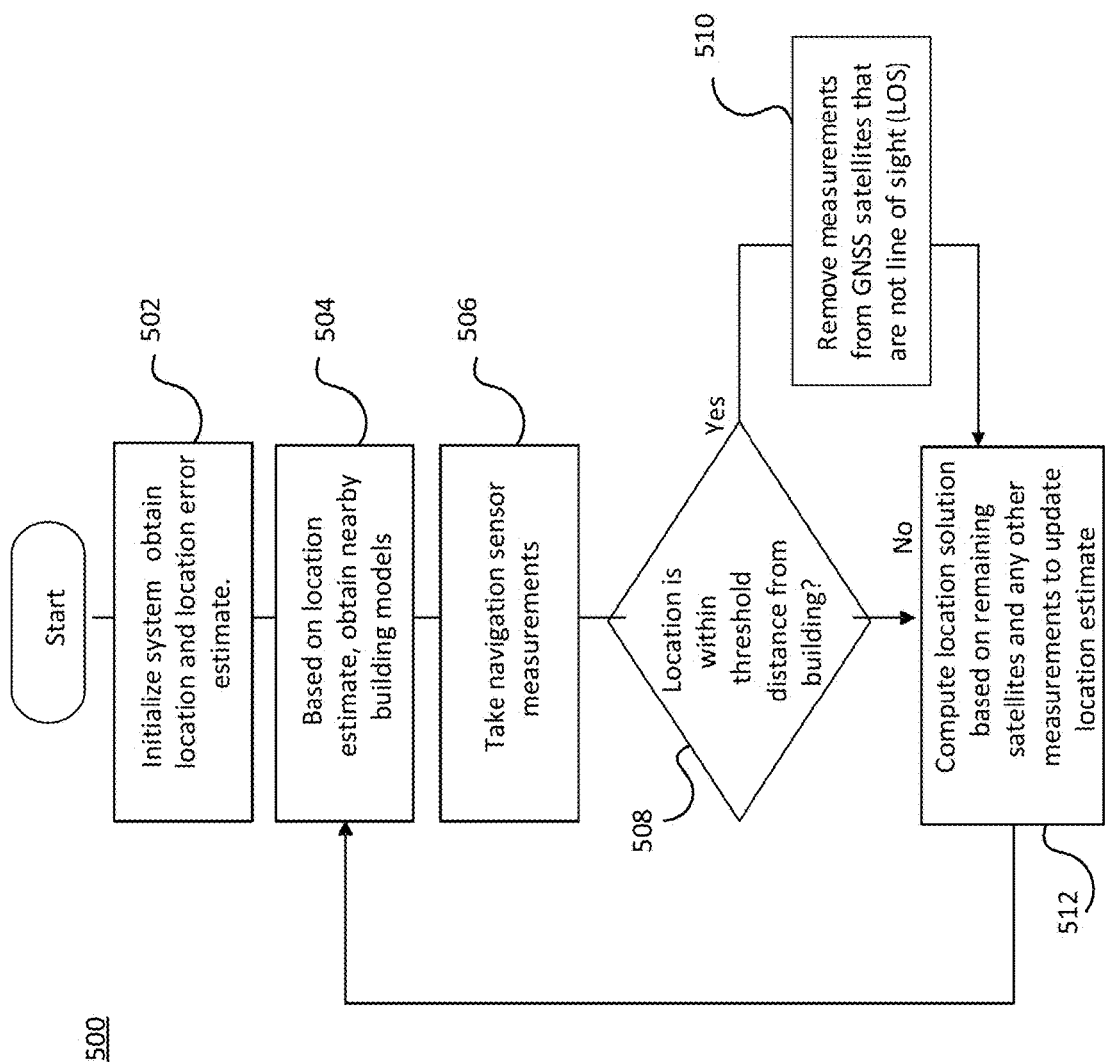
FIG. 5 is a flow chart illustrating one example of a method for determining when to remove GNSS satellite measurements from a GNSS location computation.

FIG. 5 shows another method for adjusting the GNSS error estimate based on environmental information. The method 500 begins with initializing the system and obtaining a location estimation and a location error estimation (operation 502). A reasonable location estimate is needed in order to know which buildings are nearby. The location estimate may be based on good GNSS or user map check-in. Depending on how close the receiver is to the building, certain satellites are blocked from view. The method 500 continues with obtaining building models for nearby buildings based on the location estimation (operation 504). The building models may include building outlines or building height information. The method 500 continues with taking new navigation sensor measurements (operation 506). The location estimate and location error estimate may be obtained as output from any location service providing a sensor fusion solution, or directly from the GNSS receiver.

Next, the method 500 determines whether the location is within a threshold distance from the building (operation 508). If the location is within the threshold distance from the building, the method 500 continues to remove measurements from GNSS satellites that are not line-of-sight (operation 510). Building model data may be used to compute the set of visible satellites (satellites with line of sight signals) at a given time if building heights and distance from the receiver are known along with the satellite ephemeris (including very precise satellite orbital parameters) or almanac data (including more coarse satellite orbital parameters.) The azimuth and elevation of each satellite relative to the receiver location may be computed. If that ray at that azimuth and elevation intersects the building, then the satellite is not line of sight. If only building footprints are available, satellites below a certain threshold elevation may be assumed to be non-line of sight in the direction of the building because overhead satellites are most likely to be visible. For non-line of sight satellites, their measurements should be removed from the location computation (pseudo range, pseudo range rate, carrier phase, doppler, etc.) The method 500 then computes a location solution based on the remaining line of sight satellites and any other measurements to update the location estimate (operation 512). The method 500 then returns to operation 504. If the location is not within the threshold distance from the building, the method 500 completes operation 512 and then returns to operation 504.

In yet another embodiment, the GNSS measurement may be rejected entirely. For example, if the GNSS receiver returns an estimate that is not consistent with the fused location solution and its error estimate, the GNSS measurement may be rejected completely. This may happen, for example, when there are little or no direct line of sight satellite measurements.

Figure 6:
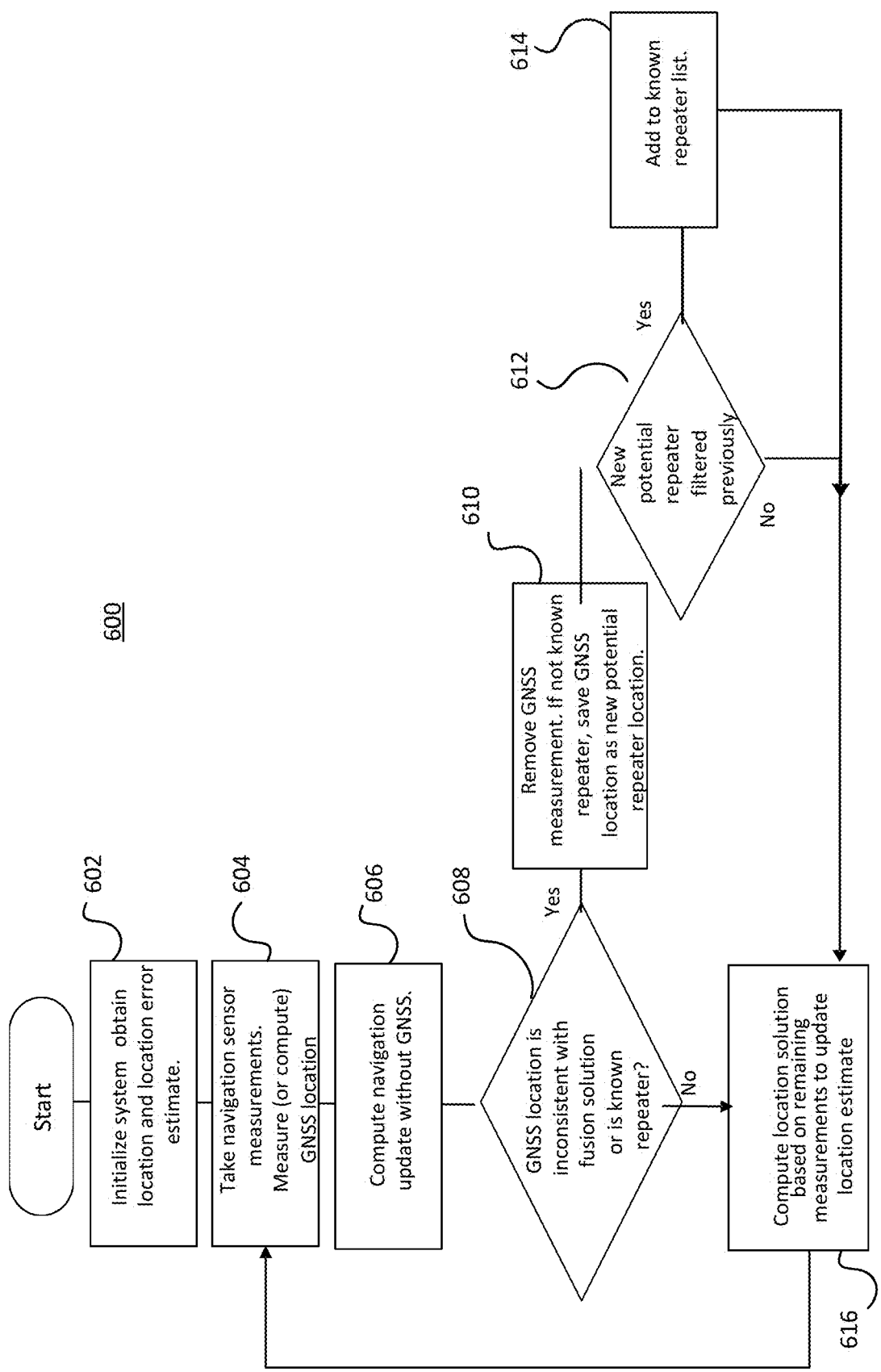
FIG. 6 is a flow chart illustrating one example of a method for determining when to remove GNSS measurements from a GNSS location computation.

FIG. 6 shows another method for adjusting the GNSS error estimate based on environmental information. The method 600 begins with initializing the system and obtaining a location estimation and a location error estimation (operation 602). A reasonable location estimate may be needed and may be based on good GNSS or user map check-in. The method 600 continues with taking new navigation sensor measurements (operation 604). The location estimate and location error estimate may be obtained as output from any location service providing a sensor fusion solution, or directly from the GNSS receiver. The method 600 continues to compute a navigation update without GNSS (operation 606). With each measurement, the fused solution propagates forward based on other sensor measurements (e.g., inertial, vision, radio frequency, other) but excluding GNSS.

This fusion solution is compared to the GNSS measurement (operation 608). If the sensor fusion predicted location without GNSS (accounting for location uncertainty) is not inconsistent with GNSS location input (also accounting for GNSS location uncertainty), then the method 600 computes a location solution based on the remaining measurements to update the location estimate (operation 616). The method 600 then returns to operation 604. Conversely, if the sensor fusion predicted location without GNSS (accounting for location uncertainty) is inconsistent with GNSS location input (also accounting for GNSS location uncertainty), then the GNSS measurement is ignored (operation 610). For example, if the fusion solution and its error bound have little or no overlap with the GNSS location and its error bound, the GNSS input could be considered inconsistent. The method 600 then determines whether this potential repeater has been filtered previously (operation 612). If it has been filtered previously, then the potential repeater is added to a known repeater list (operation 614) and the method 600 completes operation 616 then returns to operation 604. If the potential repeater has not been filtered previously, then the method 600 completes operation 616 then returns to operation 604.

Similar adjustments may be made for other natural interferences. For example, when a receiver is known to be in heavy canopy or in mountainous regions, environmental information may be used to adjust the GNSS error measurement, eliminate some satellites from the location computation, or reject the GNSS measurement entirely.

Electronic Signal Interference: GNSS systems (for example, smartphones) may be set up to repeat the last known GNSS location if the signal is lost. As seen in FIG. 7a, when a device is taken into a building 702, the device may lose its signal from outside of the building 702. The device may then repeat a GNSS constraint 706 from outside of the building 702. While this may be useful for a system relying on only GNSS, if added into a fusion solution 704, it will add error, as illustrated in FIG. 7b.

Figure 8A:
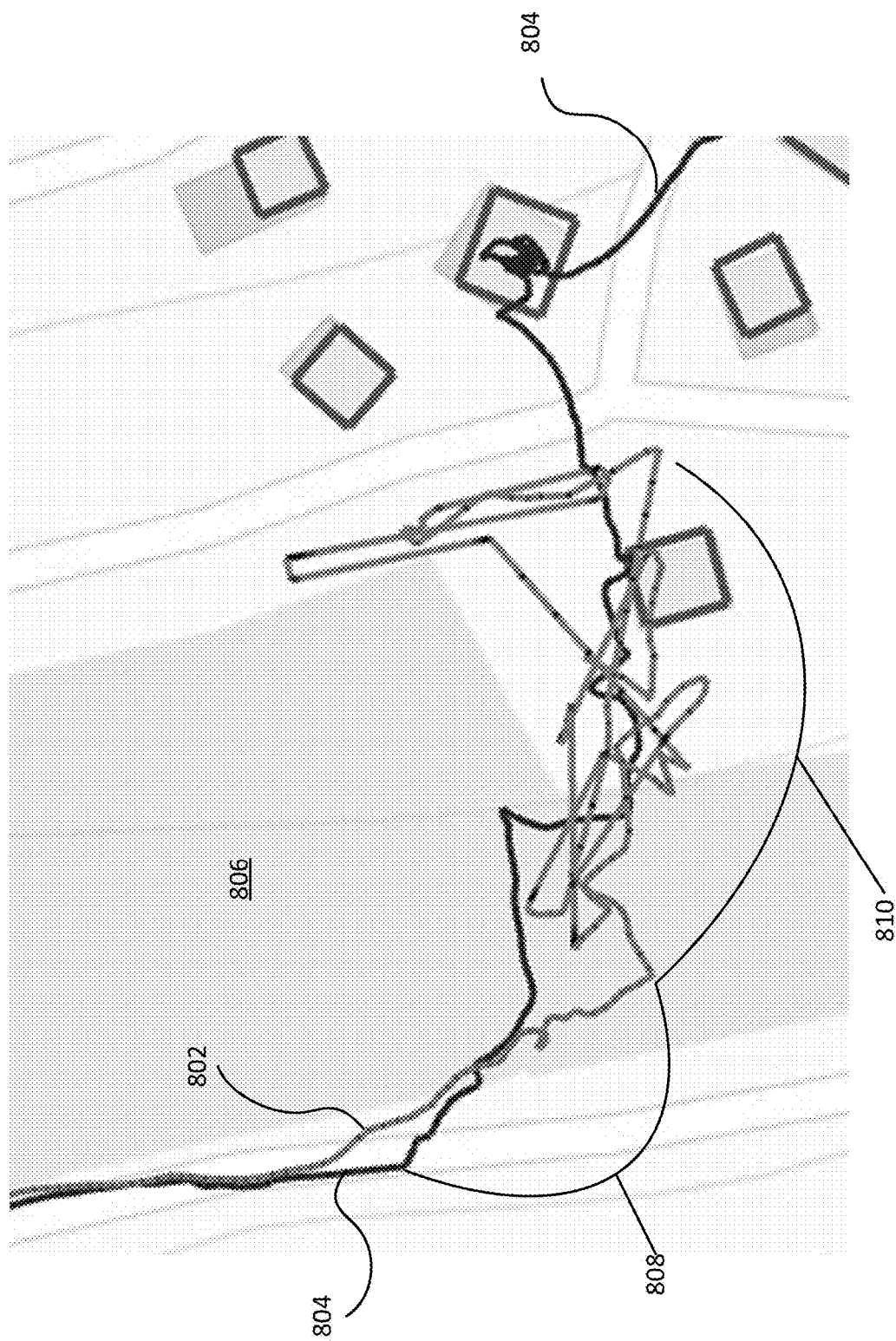
FIG. 8a depicts an exemplary illustration of a fusion solution detecting and ignoring GNSS signal interference.
Figure 8C:
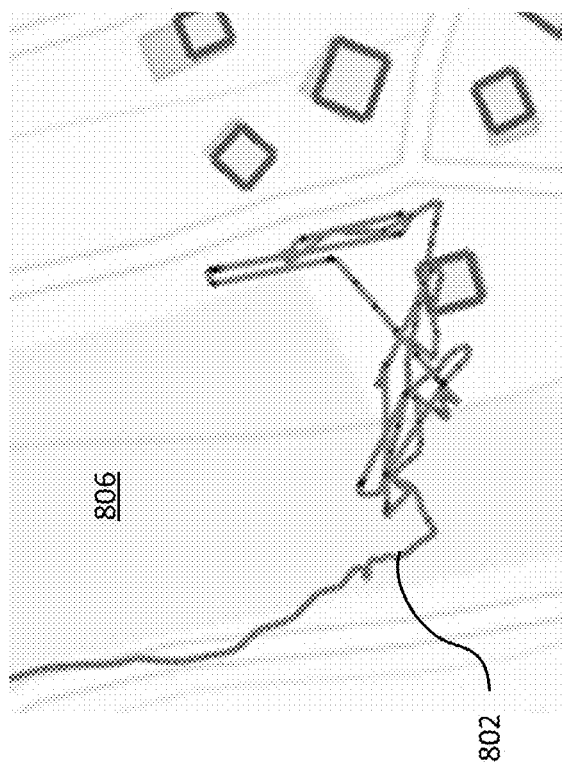
Figure 8B:

GNSS repeaters and simulators may also be used to intentionally provide false information. More sophisticated GNSS interference may intentionally provide false signals that cause the receiver to report false, non-stationary locations. This intentional interference may lead a user to believe that they are moving along an incorrect route. A sensor fusion system must be able to detect and reject this false information. Referring to FIGS. 8a, 8b and 8c, natural GNSS interference and intentional signal interference may be detected and ignored when adjusting GNSS input to the fusion solution. Natural GNSS interference, which may be the result of trees 806, and intentional signal interference may cause the GNSS path to be inconsistent with the actual track. For example, the GNSS path affected by interference 802 may be adjusted by a fusion algorithm that detects and ignores intentional signal interference. In an embodiment, the intentional signal interference may cause slight path distortion 808 or significant path distortion 810 in a GNSS path. The fusion algorithm may maintain a more accurate GNSS track 804. FIG. 8a illustrates both the interference path 802 and the fused track 804, while FIGS. 8b and 8c show the separate track 804 and path 802, respectively.

FIGS. 9a and 9b depict an example of intentional GNSS interference where a GNSS simulation is broadcast inside a building. The simulation starts near the current location then moves the GNSS location far away from the actual location. In this case, the motion and location of the GNSS signal are inconsistent with the fusion solutions location without GNSS.

Sensor fusion systems may have information that enable the system to compute its own position or speed independent of GNSS input. The knowledge of the independently computed system motion or simply a system's motion limitations may be used to validate GNSS input. The sensor fusion system may compute an expected motion 910 for the GNSS when a device is taken into a building 902 and the device loses its signal. The device may lose its signal at a location 906 outside of the building 902 resulting in a GNSS path error 904. When the device loses its signal at the location 906, a GNSS simulation 908 begins to simulate the motion of the device. If the GNSS simulation 908 does not match the expected motion 910 computed by the sensor fusion system, as illustrated in FIG. 9b, the GNSS simulation 908 may be disregarded and the sensor fusion system may continue to accurately track the movement of the device.

In an embodiment, the sensor fusion system may compute independent speed measurements, which may be used to validate GNSS input. If there is no interference, the GNSS system speed should be consistent with the independently computed system speed. If, based on the GNSS independent speed computation, the system is moving, then the system should not be in a fixed (repeated) location. Additionally, the system should not be moving much faster than the independently computed system speed indicates. Even without specific independent measurement data, known maximum system speed limitations may be used to reject erroneous GNSS input. For example, a person walking or a driving in a vehicle can only move so fast.

Over each time interval, the system cannot have moved more than would be possible based on its GNSS independent measured speed (or its maximum speed if independent measurements are not available). GNSS computed locations (or other GNSS measurements) that would have the system moving inconsistently with the independently computed speed or the maximum speed that the system could feasibly move should be rejected.

Figure 10:
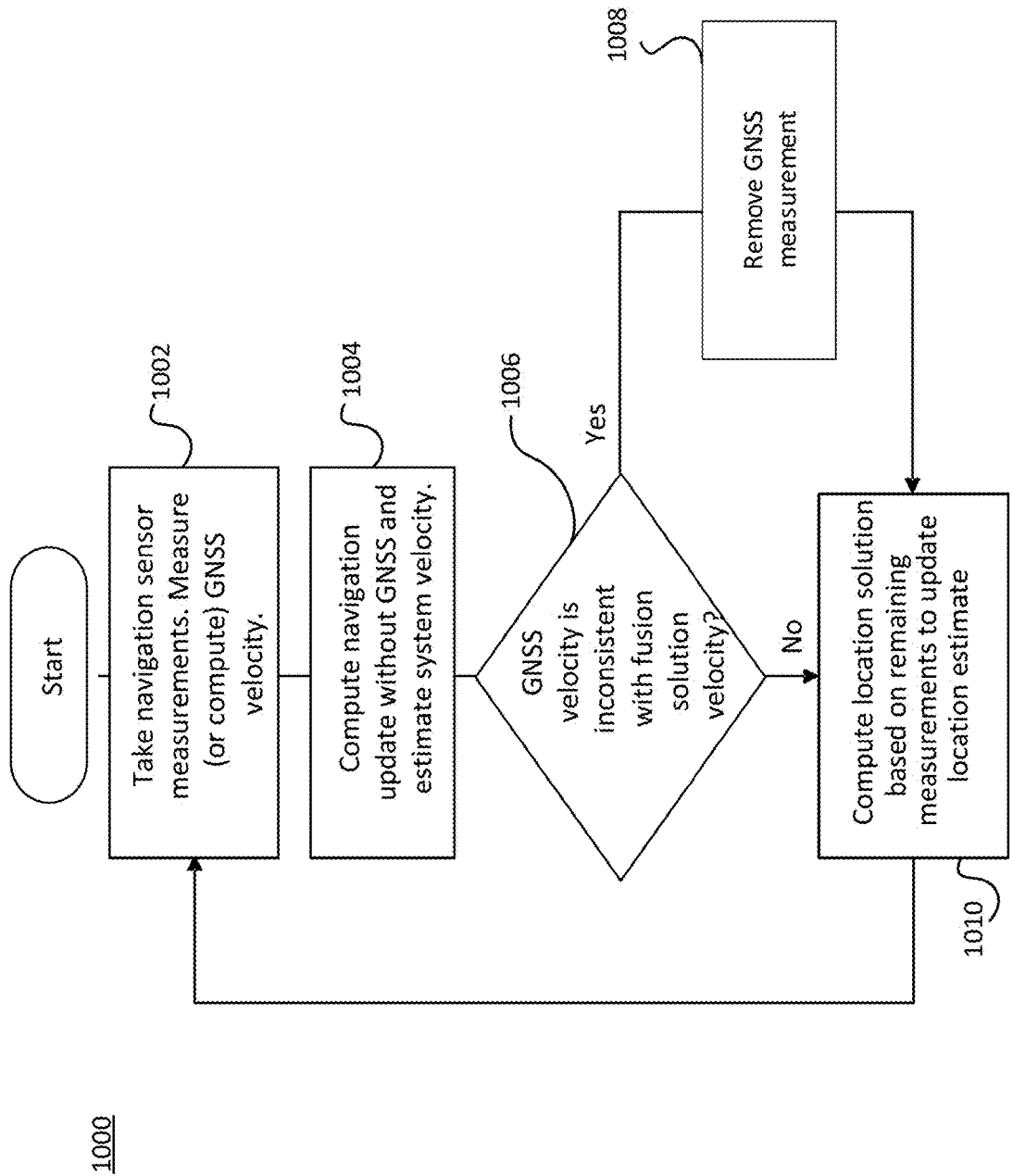
FIG. 10 is a flow chart illustrating another example of a method for determining when to remove GNSS measurements from a GNSS location computation.

FIG. 10 shows one method for determining when to remove GNSS measurements from the computation. The method 1000 begins with taking navigation sensor measurements in order to measure or compute the GNSS velocity (operation 1002). The method 1000 deviates slightly from method 300 in that, with velocity checks, the absolute georeferenced location does not have to be known. However, the GNSS receiver should be initialized because, on start up before the GNSS solution has converged, the computed locations may jump around more than usual. The mobile device being tracked may also provide a cell restraint which could be significantly distant from the true location, and it is not desirable to lock in on the first bad location estimate if the jump to the correct location would imply a velocity that is too fast.

The method 1000 continues with computation of a navigation update without GNSS and estimating a system velocity (operation 1004). With each subsequent measurement, the fused solution is propagated forward based on other sensor measurements (e.g., inertial, vision) but excluding GNSS, and the system velocity is updated. The fused solution is then compared to the GNSS measured or computed velocity (operation 1006). If the fusion velocity prediction (accounting for velocity uncertainty), or simply the system maximum speed, is inconsistent with GNSS velocity (also accounting for GNSS uncertainty), then the GNSS measurement should be ignored (operation 1008). The method 1000 then continues to compute a location solution based on the remaining measurements to update the location estimate (operation 1010) and then returns to operation 1002. Conversely, if the fusion velocity prediction (accounting for velocity uncertainty), or simply the system maximum speed, is not inconsistent with GNSS velocity (also accounting for GNSS uncertainty), then the method 1000 performs operation 1010 then returns to operation 1002.

In another embodiment, the sensor fusion system may compute independent system movement measurements, which may be used to validate GNSS input. If there is no interference, the GNSS movement should be consistent with the independent system computed movement. For example, the sensor fusion system may compute, without GNSS input, a location and location error estimate based on movement from a last known good location. The good location may be based on a user input location, prior consistent GNSS measurements, a range to a known location, or other information. GNSS values outside of the system's location estimate (or some expansion of this estimate) should be rejected.

Figure 11B:
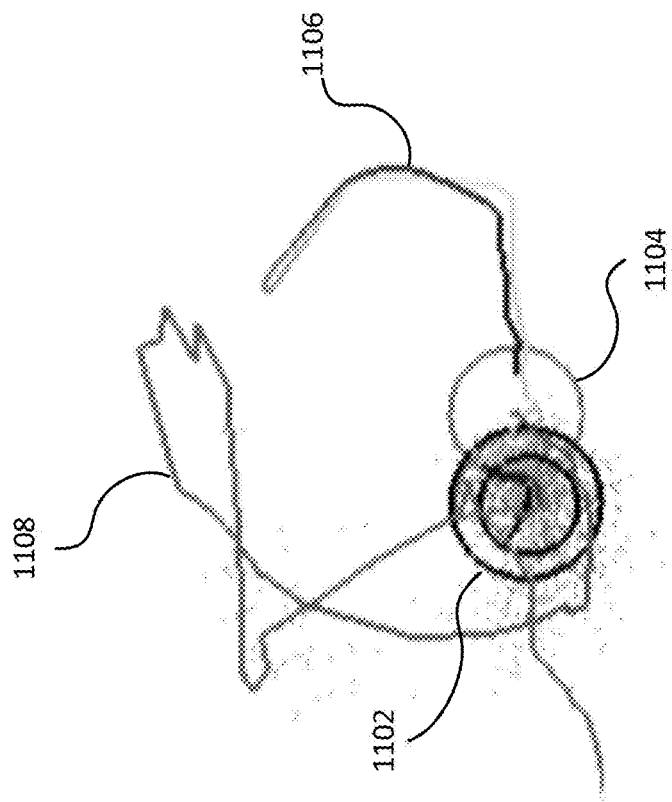
FIGS. 11a and 11b depict an exemplary illustration of GNSS movement that is inconsistent with a fusion solution movement.
Figure 11A:
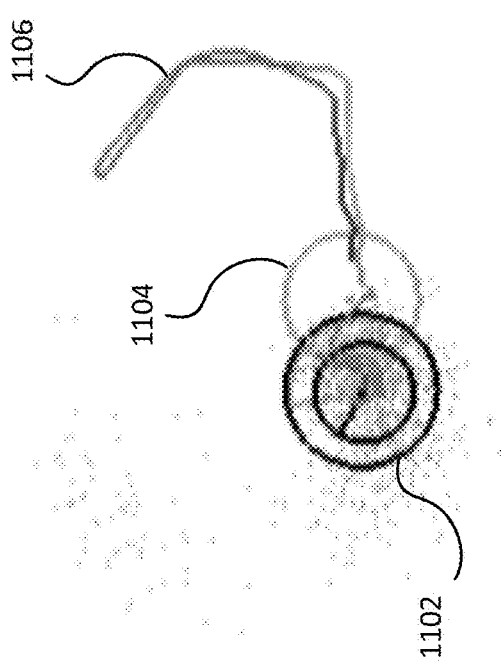

As seen in FIG. 11a, a GNSS location 1104 may be outside of the fusion solution error bound 1102 but still be feasible. Comparing the motion of the GNSS solution to the fusion solution 1106 (independent of GNSS) may provide additional input when determining whether to trust GNSS input. Looking at the GNSS location solution alone, it seems like the GNSS could reasonably be correct. However, as seen in FIG. 11b, looking at the GNSS solution motion 1108 relative to the fusion solution motion 1106 makes it clear that the GNSS solution's behavior is inconsistent with the fusion solution and so may be incorrect.

Figure 12:
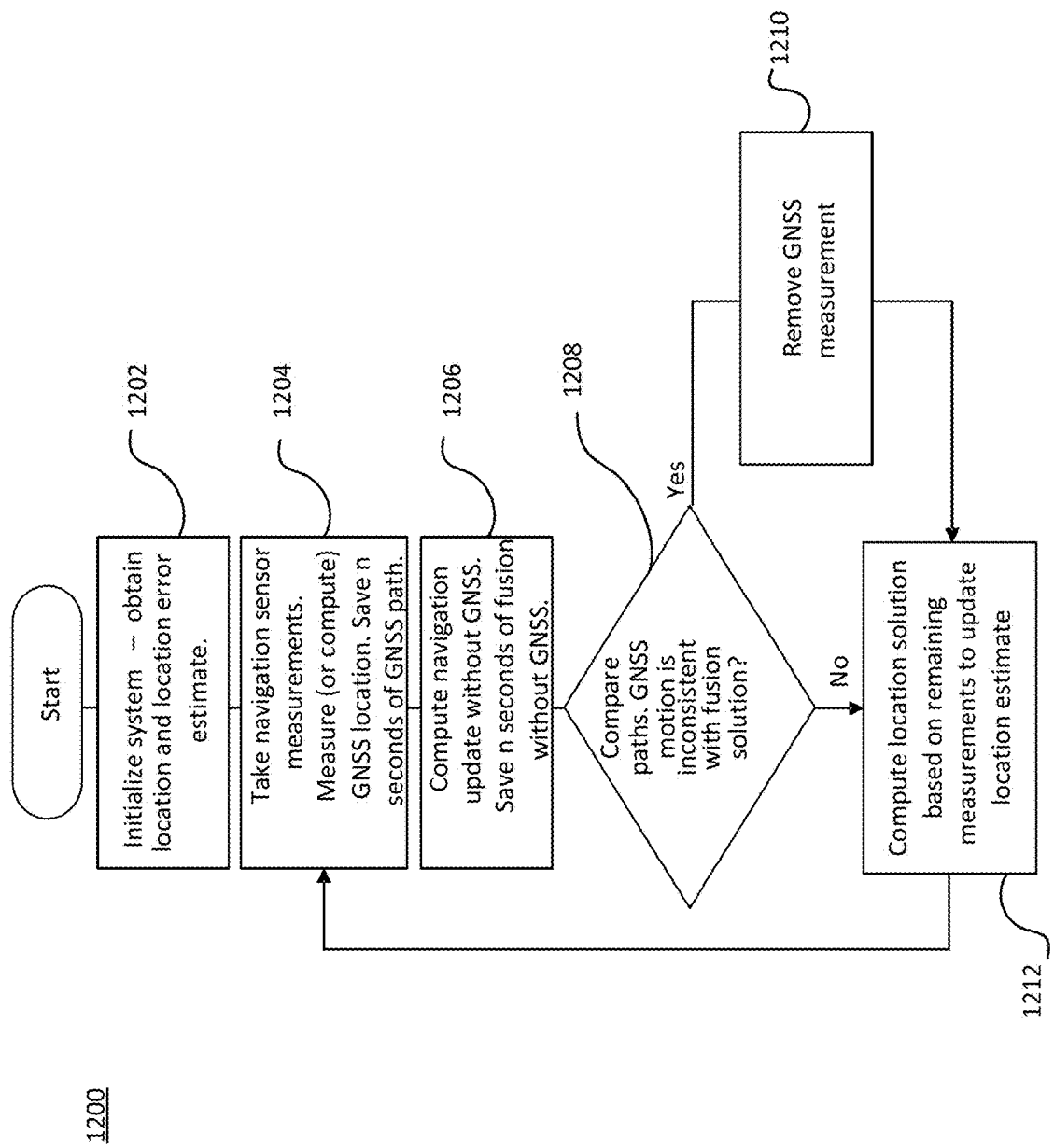
FIG. 12 is a flow chart illustrating another example of a method for determining when to remove GNSS measurements from a GNSS location computation.

FIG. 12 shows another method for determining when to remove GNSS measurements from the computation. The method 1200 begins with initializing the system and obtaining a location estimate and a location error estimate (operation 1202). Next, the method 1200 continues with taking navigation sensor measurements to compute a GNSS location and saving n seconds of the GNSS path (operation 1204). The method 1200 continues with computing a navigation update without GNSS and saving n seconds of the fusion path without GNSS (operation 1206). The GNSS path and the fusion path without GNSS are then compared to see if the GNSS motion is inconsistent with the fusion solution (operation 1208). Comparing motion data requires computing and storing some length of historical GNSS and fusion solution independent of GNSS in order to compare path shapes over some period. Path shapes may be simplified or smoothed. If the GNSS path shape difference is greater than a threshold then the GNSS measurement should be removed (operation 1210). The method 1200 then computes a location solution based on the remaining measurements to update the location estimate (operation 1212) then returns to operation 1204. If the GNSS path shape difference is not greater than a threshold, the method 1200 performs operation 1212 then returns to operation 1204.

If the system does not have a sophisticated sensor fusion system computing an independent location estimate, a simple computation of maximum distance traveled since the last known good location may be used to filter GNSS. For example, the computation of maximum distance traveled since the last known good location may be based on maximum system speed or on a simple measurement such as step count or wheel rotation. In all cases, measurement uncertainty should be accounted for when computing the maximum distance traveled. Using this information, the system must be located within a circle with the radius of the maximum distance traveled around the last good location. GNSS values outside of this circle of maximum distance should be rejected.

Recovery: Once interference is detected; the system should review prior GNSS inputs to determine if any previously applied GNSS measurements are questionable and need to be removed from the fused solution.

Figure 13:
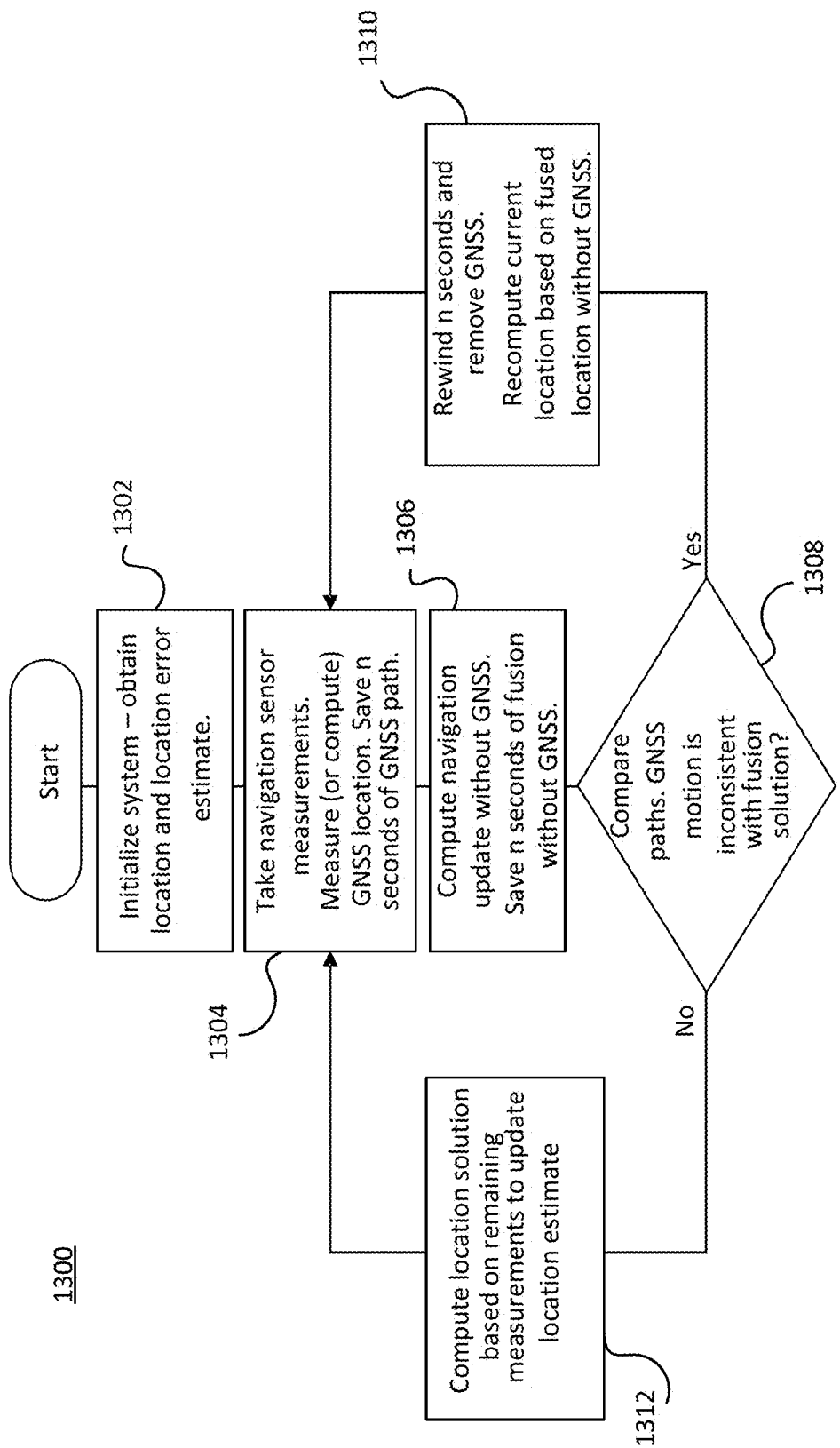
FIG. 13 is a flow chart illustrating an example of a method for rewinding a fusion solution to remove questionable past restraints over a segment of motion.

As seen in FIG. 13, the fusion solution may be rewound, and questionable past restraints may be removed. The method 1300 begins with initializing the system and obtaining a location estimate and a location error estimate (operation 1302). The method 1300 continues with taking navigation sensor measurements by measuring a GNSS location and saving n seconds of GNSS path (operation 1304). The method 1300 continues with computing a navigation update without GNSS and saving n seconds of fusion without GNSS (operation 1306). Next, the method 1300 compares the GNSS motion with the fusion solution (operation 1308). If the GNSS motion is not inconsistent with the fusion solution, then the method 1300 continues with computing a location solution based on the remaining measurements in order to update the location estimate (operation 1312). The method 1300 then returns to operation 1304. Conversely, if the GNSS motion is inconsistent with the fusion solution, then the method 1300 continues with rewinding n seconds, removing GNSS, and recomputing a current location based on a fused location without GNSS (operation 1310). The method then returns to operation 1304.

The system may also use the rewind capability to handle out-of-order constraints. The computation of the fused solution without GNSS since the last good input enables the system to be quickly updated with a correct solution with GNSS removed. The system should continue to be monitored with similar methods to understand when GNSS interference has subsided and GNSS can again be used as part of the fusion solution. applications.

Figure 14:
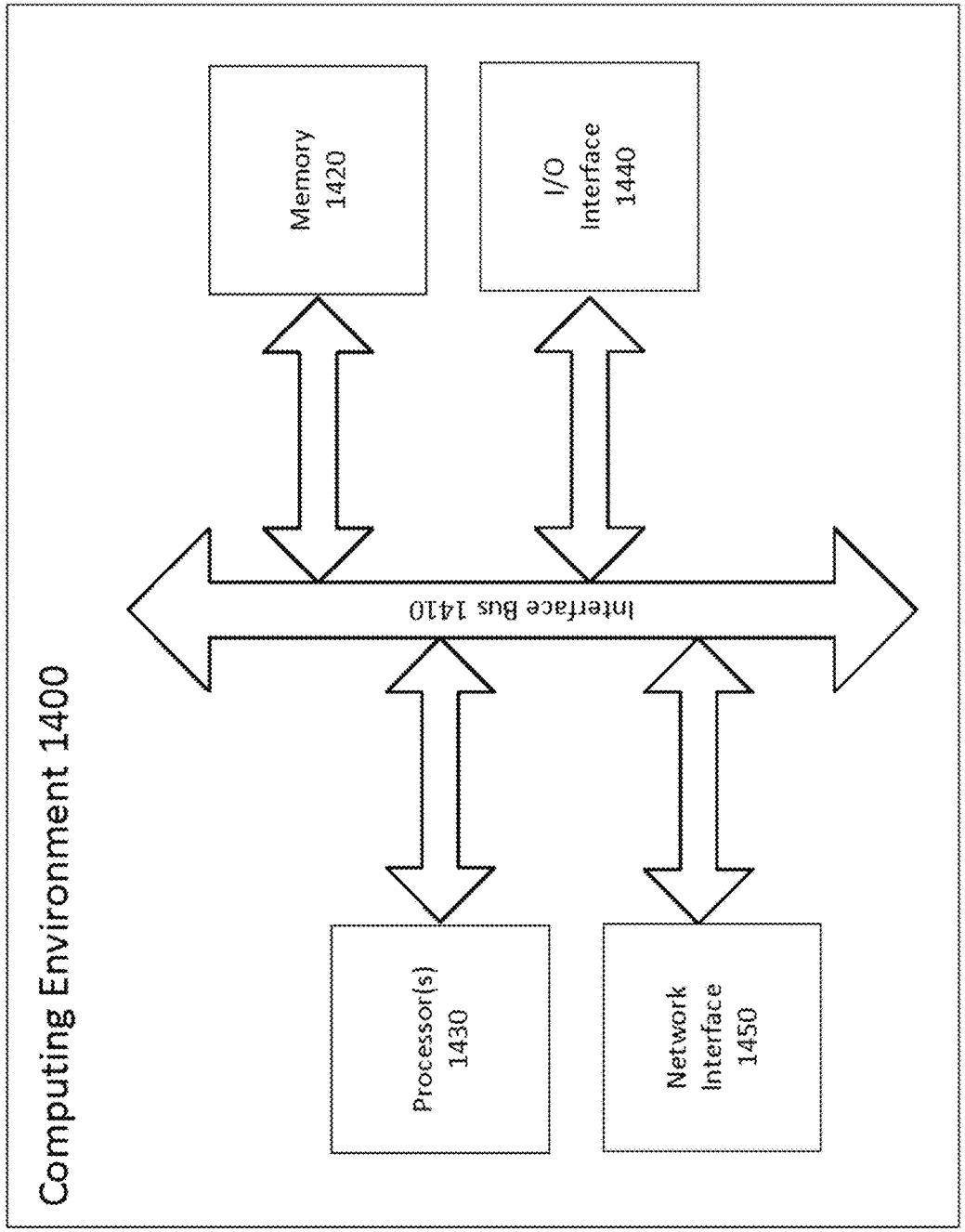
FIG. 14 depicts an exemplary computing environment.

FIG. 14 illustrates an exemplary computing environment in which embodiments of the present disclosure may be depicted and generally referenced as computing environment 1400. As utilized herein, the phrase "computing system" generally refers to a dedicated computing device with processing power and storage memory, which supports operating software that underlies the execution of software, applications, and computer programs thereon, such as mobile device 102 of FIG. 1. As shown by FIG. 14, computing environment 1400 includes bus 1410 that directly or indirectly couples the following components: memory 1420, one or more processors 1430, I/O interface 1440, and network interface 1450. Bus 1410 is configured to communicate, transmit, and transfer data, controls, and commands between the various components of computing environment 1400.

Computing environment 1400, such as a PC or smart phone, typically includes a variety of computer-readable media. Computer-readable media can be any available media that is accessible by computing environment 1400 and includes both volatile and nonvolatile media, removable and non-removable media. Computer-readable media may comprise both computer storage media and communication media. Computer storage media does not comprise, and in fact explicitly excludes, signals per se.

Computer storage media includes volatile and nonvolatile, removable and non-removable, tangible and non-transient media, implemented in any method or technology for storage of information such as computer-readable instructions, data structures, program modules or other data. Computer storage media includes RAM; ROM; EE-PROM; flash memory or other memory technology; CD-ROMs; DVDs or other optical disk storage; magnetic cassettes, magnetic tape, magnetic disk storage or other magnetic storage devices; or other mediums or computer storage devices which can be used to store the desired information, and which can be accessed by computing environment 1400.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Memory 1420 includes computer-storage media in the form of volatile and/or nonvolatile memory. The memory may be removable, non-removable, or a combination thereof. Memory 1420 may be implemented using hardware devices such as solid-state memory, hard drives, optical-disc drives, and the like. Computing environment 1400 also includes one or more processors 1430 that read data from various entities such as memory 1420, I/O interface 1440, and network interface 1450.

I/O interface 1440 enables computing environment 1400 to communicate with different input devices and output devices. Examples of input devices include a keyboard, a pointing device, a touchpad, a touchscreen, a scanner, a microphone, a joystick, and the like. Examples of output devices include a display device, an audio device (e.g.

speakers), a printer, and the like. These and other I/O devices are often connected to processor 1410 through a serial port interface that is coupled to the system bus, but may be connected by other interfaces, such as a parallel port, game port, or universal serial bus (USB). A display device can also be connected to the system bus via an interface, such as a video adapter which can be part of, or connected to, a graphics processor unit. I/O interface 1440 is configured to coordinate I/O traffic between memory 1420, the one or more processors 1430, network interface 1450, and any combination of input devices and/or output devices.

Network interface 1450 enables computing environment 1400 to exchange data with other computing devices via any suitable network. In a networked environment, program modules depicted relative to computing environment 1400, or portions thereof, may be stored in a remote memory storage device accessible via network interface 1450. It will be appreciated that the network connections shown are exemplary and other means of establishing a communications link between the computers may be used.

It is understood that the term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s). Additionally, computer executable instructions embodying aspects of the disclosure may be stored in ROM EEPROM, hard disk (not shown), RAM, removable magnetic disk, optical disk, and/or a cache of processing unit. A number of program modules may be stored on the hard disk, magnetic disk, optical disk, ROM, EEPROM or RAM, including an operating system, one or more application programs, other program modules and program data. It will be appreciated that the various features and processes described above may be used independently of one another or may be combined in various ways. All possible combinations and sub-combinations are intended to fall within the scope of this disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In an embodiment, a computer implemented method of adjusting input in a global navigation satellite system (GNSS) may comprise initializing a fusion system at a GNSS receiver, wherein initializing the fusion system comprises receiving the input from at least one satellite in the GNSS and computing a GNSS location estimate and a GNSS location error estimate, the fusion system comprising one or more location sensors, loading, to the fusion system, environmental data for a geographical area including the GNSS based on the GNSS location estimate, taking navigation sensor measurements using the one or more location sensors, wherein the navigation sensor measurements comprise a sensor location estimate and a sensor location error estimate, applying one or more GNSS filters to compute a fusion solution, wherein the one or more GNSS filters adjust or reject the GNSS location estimate or the GNSS location error estimate based on at least one of the environmental data and the navigation sensor measurements, and updating the fusion solution based on the one or more GNSS filters.

In the embodiment, wherein initializing the fusion system may further comprise ensuring that at least one of an attitude estimate, a scale estimate, and a drift estimate for the receiver are available. In the embodiment, wherein the one or more location sensors may comprise at least one of an accelerometer, a gyroscope, a barometer, a magnetic sensor, a ranging sensor, and a vision sensor. In the embodiment, wherein the environmental data may comprise at least one of a terrain, a tree coverage, building models, roads, and trails. In the embodiment, wherein computing the GNSS location estimate and the GNSS location error estimate during initialization may be based on at least one of a good GNSS, a user map check-in, and a range to a known location.

In the embodiment, wherein the environmental data may comprise one or more building models, and wherein the one or more GNSS filters may comprise a filter that adjusts the GNSS location error estimate based on a proximity of the GNSS location estimate to the one or more building models or a height of the building models. In the embodiment, wherein updating the fusion solution may comprise applying the adjusted GNSS location error estimate to update the GNSS location estimate. In the embodiment, wherein the filter may triple the GNSS error estimate if the GNSS location estimate is within 5 feet of the one or more building models and double the GNSS error estimate if the GNSS location estimate is within 20 feet of the one or more building models. In the embodiment, wherein the GNSS error estimate may be adjusted by increasing a radius of the GNSS error estimate or increasing the GNSS error estimate along a single axis.

In the embodiment, wherein the environmental data may comprise one or more building models, and wherein the one or more building models may be used to identify at least one non-line of sight satellite providing input to the GNSS receiver. In the embodiment, wherein the one or more GNSS filters may comprise a filter that removes a signal from the at least one non-line of sight satellite from the fusion solution. In the embodiment, wherein updating the fusion solution may comprise computing the fusion solution based on remaining satellites.

In the embodiment, may further comprise, after taking navigation sensor measurements, computing a navigation update without GNSS input. In the embodiment, wherein the one or more GNSS filters comprises a filter that rejects the GNSS location estimate if the GNSS location estimate and the GNSS location error estimate are inconsistent with the sensor location estimate and the sensor location error estimate. In the embodiment, may further comprise saving the rejected GNSS location estimate as a new potential repeater location if the rejected GNSS location estimate has not been rejected before and saving the rejected GNSS location estimate as a known repeater location if the rejected GNSS location estimate has been rejected before, wherein updating the fusion solution may comprise computing the fusion solution based on remaining measurements.

In the embodiment, wherein initializing the fusion system may further comprise computing a GNSS velocity estimate and the method further comprises estimating a sensor system velocity without GNSS input. In the embodiment, wherein the one or more GNSS filters comprises a filter that rejects the GNSS velocity estimate if the GNSS velocity estimate is inconsistent with the sensor system velocity.

In the embodiment, may further comprise saving a GNSS path over a time interval and saving a fusion path without GNSS over the time interval. In the embodiment, wherein the one or more GNSS filters may comprise a filter that removes the saved GNSS path from the fusion solution when the saved GNSS path is inconsistent with the saved fusion path. In the embodiment, may further comprise rewinding the fusion solution for a period equal to the time interval.

In an embodiment, a computer implemented method of validating an output from a global navigation satellite system (GNSS) may comprise receiving at a GNSS receiver including a fusion system an output from at least one satellite in the GNSS, the fusion system comprising one or more location sensors; computing a location estimate and a location error estimate; computing a navigation update with the fusion system based on sensor measurements from the one or more location sensors, wherein the navigation update includes a sensor location estimate and a sensor location error estimate; determining if one or more GNSS filters should be applied based at least on the location estimate, the sensor location estimate, and the sensor location error estimate; when the one or more GNSS filters should be applied, applying the one or more GNSS filters by adjusting or rejecting one or more of the location estimate and the location error estimate and computing a new navigation update with the fusion system based on the adjusting or rejecting of the one or more of the location estimate and the location error estimate; and when the one or more GNSS filters should not be applied, computing the new navigation update with the fusion system based on accepting the location estimate and the location error estimate.

In the embodiment, wherein computing a location estimate and location error estimate may include initializing the fusion system based on one or more of a good GNSS fix, a user map check-in, and a range to a known location.

In the embodiment, wherein initializing the fusion system may comprise ensuring that at least one of an attitude estimate, a scale estimate, and a drift estimate for the GNSS receiver are available.

In the embodiment, the method may further comprise: receiving at the GNSS receive environmental information based on the location estimate and the location error estimate, and wherein the adjusting or rejecting the one or more of the location estimate and the location error estimate may be based on the environmental information.

In the embodiment, wherein adjusting or rejecting the one or more of the location estimate and the location error estimate may include one or more of adjusting the location error estimate, removing the output from one or more satellites in the output from the GNSS, and rejecting the output from the GNSS.

In the embodiment, wherein adjusting the location error estimate may include increasing the location error estimate when the location estimate is within a threshold distance from a building.

In the embodiment, wherein adjusting the location error estimate may include tripling the location error estimate if the threshold distance is within 5 feet of the building and doubling the location error estimate if the threshold distance is within 20 feet of the building.

In the embodiment, wherein adjusting the location error estimate may include increasing a radius of the location error estimate or increasing the location error estimate along a single axis.

In the embodiment, wherein removing the output from one or more satellites may include removing the output from a satellite when the satellite is determined to not be in a direct line of sight to the GNSS receiver.

In the embodiment, wherein the satellite may be determined to not be in a direct line of sight based on a height of a building, a distance from the GNSS receiver to the building, and an azimuth and elevation of the satellite relative to the location estimate.

In the embodiment, wherein the environmental information may include one or more of map data, a building outline, a building height and terrain data.

In the embodiment, wherein determining if the one or more GNSS filters should be applied may include comparing the sensor location estimate to the location estimate and the sensor location error estimate to the location error estimate and applying the one or more GNSS filters when the comparison is inconsistent.

In the embodiment, wherein the comparison may be inconsistent when there is little to no overlap between one or more of the sensor location estimate and the location estimate and the sensor location error estimate and the location error estimate.

In the embodiment, wherein determining if the one or more GNSS filters should be applied may include: computing a first movement of the GNSS receiver independent of the output of the GNSS; computing a second movement of the GNSS receiver dependent on the output of the GNSS; comparing the first movement to the second movement; and when the first movement is inconsistent with the second movement rejecting the one or more of the location estimate and the location error estimate.

In the embodiment, wherein the first movement may be a first velocity and the second movement may be a second velocity.

In the embodiment, wherein the first movement may be a first path shape and the second movement may be a second path shape.

In the embodiment, wherein rejecting the one or more of the location estimate and the location error estimate may include: saving the first path shape and the second path shape over a period; comparing the first path shape to the second path shape; and recomputing the new navigation update with the fusion system if the first path shape is inconsistent with the second path shape.

In the embodiment, wherein the first movement may be a first distance traveled from a known location and the second movement may be a second distance traveled from the known location.

In the embodiment, wherein the one or more location sensors may comprise at least one of an accelerometer, a gyroscope, a barometer, a magnetic sensor, a ranging sensor, and a vision sensor.

In the embodiment, may further comprise: saving a rejected location estimate as a new potential repeater location if the rejected location estimate has not been rejected before and saving the rejected location estimate as a known repeater location if the rejected location estimate has been rejected before, wherein computing the new navigation update is based on remaining measurements.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer implemented method of validating an output from a global navigation satellite system (GNSS), the method comprising:
   receiving at a GNSS receiver including a fusion system an output from at least one satellite in the GNSS, the fusion system comprising one or more location sensors;
   computing a GNSS location estimate input and a GNSS location error estimate input;
   computing a navigation update with the fusion system based on sensor measurements from the one or more location sensors, wherein the navigation update includes a sensor location estimate and a sensor location error estimate;
   determining when one or more GNSS filters are applied based at least on the GNSS location estimate input, the sensor location estimate, and the sensor location error estimate;
   wherein when the one or more GNSS filters are applied, applying the one or more GNSS filters by adjusting or rejecting one or more of the GNSS location estimate input and the GNSS location error estimate input and computing a new navigation update with the fusion system based on the adjusting or rejecting of the one or more of the GNSS location estimate input and the GNSS location error estimate input; and
   wherein when the one or more GNSS filters are not applied, computing the new navigation update with the fusion system based on accepting the GNSS location estimate input and the GNSS location error estimate input.

2. The method of claim 1, wherein the computing a GNSS location estimate input and GNSS location error estimate input includes initializing the fusion system based on one or more of a good GNSS fix, a user map check-in, and a range to a known location.

3. The method of claim 2, wherein the initializing the fusion system comprises ensuring that at least one of an attitude estimate, a scale estimate, and a drift estimate for the GNSS receiver are available.

4. The method of claim 1, further comprising:
   receiving at the GNSS receive environmental information based on the GNSS location estimate input and the GNSS location error estimate input, and wherein the adjusting or rejecting the one or more of the GNSS location estimate input and the GNSS location error estimate input is based on the environmental information.

5. The method of claim 4, wherein the adjusting or rejecting the one or more of the GNSS location estimate input and the GNSS location error estimate input includes one or more of adjusting the GNSS location error estimate input, removing the output from one or more satellites in the output from the GNSS, and rejecting the output from the GNSS.

6. The method of claim 5, wherein the adjusting the GNSS location error estimate input includes increasing the location error estimate when the location estimate is within a threshold distance from a building.

7. The method of claim 6, wherein the adjusting the GNSS location error estimate input includes tripling the GNSS location error estimate input when the threshold distance is within 5 feet of the building and doubling the GNSS location error estimate input when the threshold distance is within 20 feet of the building.

8. The method of claim 6, wherein the adjusting the GNSS location error estimate input includes increasing a radius of the GNSS location error estimate input or increasing the GNSS location error estimate input along a single axis.

9. The method of claim 5, wherein the removing the output from one or more satellites includes removing the output from a satellite when the satellite is determined to not be in a direct line of sight to the GNSS receiver.

10. The method of claim 9, wherein the satellite is determined to not be in a direct line of sight based on a height of a building, a distance from the GNSS receiver to the building, and an azimuth and elevation of the satellite relative to the location estimate.

11. The method of claim 4, wherein the environmental information includes one or more of map data, a building outline, a building height and terrain data.

12. The method of claim 1, wherein the determining when the one or more GNSS filters are applied includes comparing the sensor location estimate to the GNSS location estimate input and the sensor location error estimate to the GNSS location error estimate input and applying the one or more GNSS filters when the comparison is inconsistent.

13. The method of claim 12, wherein the comparison is inconsistent when there is little to no overlap between one or more of the sensor location estimate and the GNSS location estimate input and the sensor location error estimate and the GNSS location error estimate input.

14. The method of claim 1, wherein the determining when the one or more GNSS filters are applied includes:
   computing a first movement of the GNSS receiver independent of the output of the GNSS;
   computing a second movement of the GNSS receiver dependent on the output of the GNSS;
   comparing the first movement to the second movement; and
   when the first movement is inconsistent with the second movement rejecting the one or more of the GNSS location estimate input and the GNSS location error estimate input.

15. The method of claim 14, wherein the first movement is a first velocity and the second movement is a second velocity.

16. The method of claim 14, wherein the first movement is a first path shape and the second movement is a second path shape.

17. The method of claim 16, wherein the rejecting the one or more of the GNSS location estimate input and the GNSS location error estimate input includes:
- saving the first path shape and the second path shape over a period;
- comparing the first path shape to the second path shape; and
- recomputing the new navigation update with the fusion system when the first path shape is inconsistent with the second path shape.

18. The method of claim 14, wherein the first movement is a first distance traveled from a known location and the second movement is a second distance traveled from the known location.

19. The method of claim 1, wherein the one or more location sensors comprise at least one of an accelerometer, a gyroscope, a barometer, a magnetic sensor, a ranging sensor, and a vision sensor.

20. The method of claim 1, further comprising:
- saving a rejected GNSS location estimate input as a new potential repeater location when the rejected GNSS location estimate input has not been rejected before and saving the rejected GNSS location estimate input as a known repeater location when the rejected GNSS location estimate input has been rejected before, wherein computing the new navigation update is based on remaining measurements.

* * * * *